United States Patent [19]

Powell

[11] 3,837,686

[45] Sept. 24, 1974

[54] GAS SERVICE CONNECTOR

[76] Inventor: Jonathon S. Powell, 11 W. State St., Pasadena, Calif. 91105

[22] Filed: July 20, 1973

[21] Appl. No.: 380,981

[52] U.S. Cl. .................. 285/55, 285/139, 285/173, 285/174, 285/256, 285/348, 285/370, 285/382
[51] Int. Cl. ............................................. F16l 55/00
[58] Field of Search ............. 285/55, 174, 173, 256, 285/382, 382.1, 382.2, 397, 398, 370, 371, 348, 139

[56] References Cited
UNITED STATES PATENTS

| | | | |
|---|---|---|---|
| 1,200,798 | 10/1916 | Bennett | 285/370 |
| 3,087,747 | 4/1963 | Novotny | 285/398 |
| 3,467,414 | 9/1969 | Downing | 285/397 |
| 3,472,533 | 10/1969 | Turner | 285/371 X |
| 3,606,659 | 9/1971 | Robbins | 285/55 |

Primary Examiner—H. Hampton Hunter
Attorney, Agent, or Firm—Lyon & Lyon

[57] ABSTRACT

A gas service connector wherein a metal tube, having an outer and an inner lamination of different metals, is provided at one end with an enlarged portion to receive a plastic underground conduit and at its other end with a fitting for connection to a service member or the like; the enlarged end being fitted with an internal connecting sleeve mechanically interlocked to the inner lamination and extending within the plastic conduit; the enlarged end portion of the metal tube containing a seal member and being constrictible about the sleeve and plastic conduit to effect a mechanical interlock between the sleeve and plastic conduit as well as to effect a seal between the metal tube and plastic conduit.

6 Claims, 5 Drawing Figures

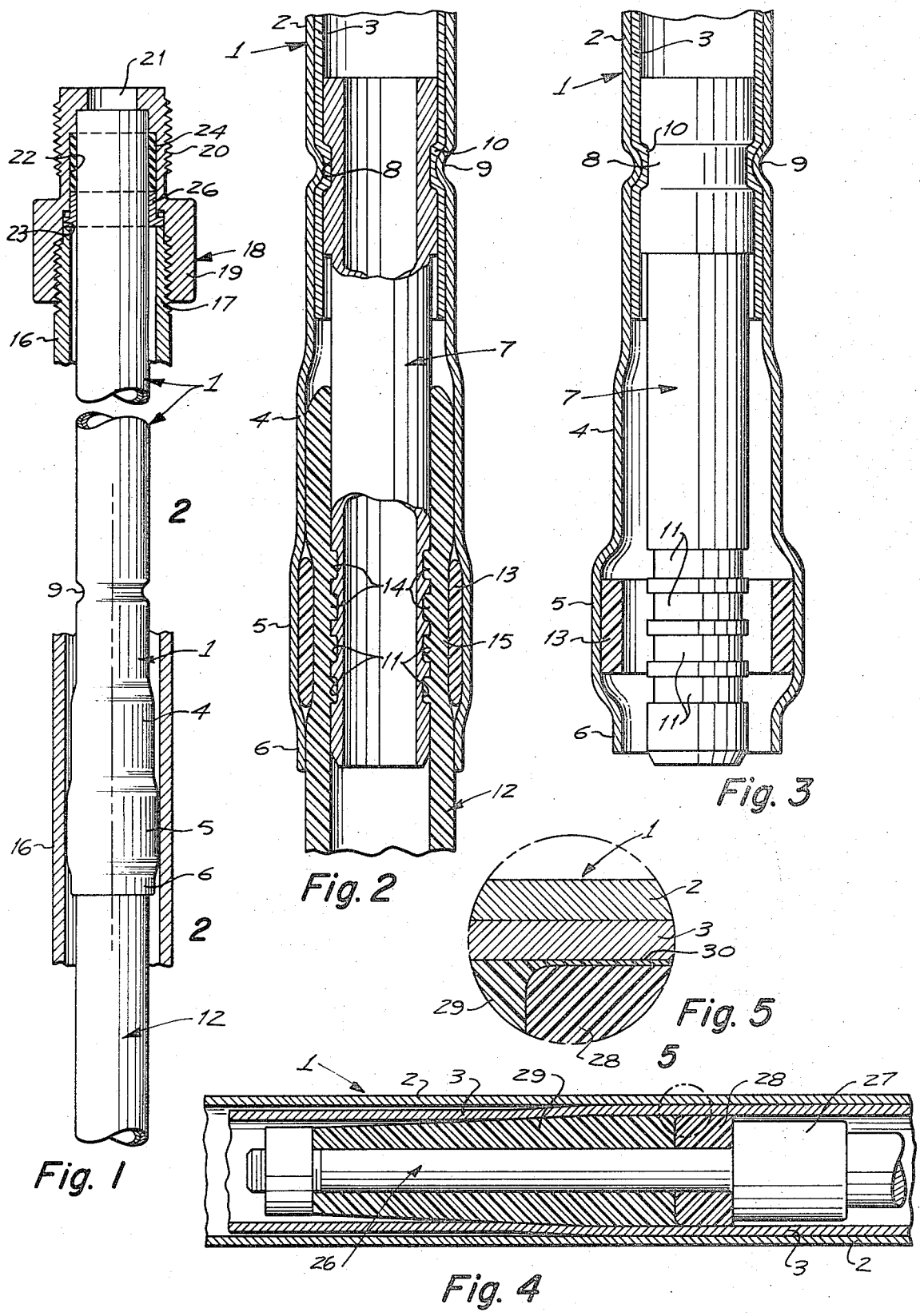

GAS SERVICE CONNECTOR

BACKGROUND OF THE INVENTION

Service connections between a gas line and service meters at the various points of use pose some severe problems. If steel or iron pipe is used as a gas line underground, it must have expensive cathodic protection to minimize leakage and the resulting danger of an explosion. It is not adequate to merely cover the underground line with an insulation wrapping, for even if a small area is not covered, electrolytic action will concentrate in such area. Plastic pipe has been developed for underground use; however, it does not have the mechanical strength for the conditions above ground. Therefore, the plastic tube must be joined to a metal pipe or tube, called a riser, to bring the gas above ground.

Typically, such connection is made preceeding the service meter. If this metal pipe is iron or steel it must be cathodically protected. If it is copper, it need not be. However, copper is corroded by the sulfur compounds in fuel gases. Preferably then, the metal pipe or tube is bimetallic; that is, the tubing includes an aluminum inner lamination and a copper outer lamination since aluminum is not effected by the sulfur in fuel gases. To meet all of the safety and dependability requirements has resulted in an expensive gas service connection.

SUMMARY OF THE INVENTION

The present invention is directed to a gas service connector which provides a solution to the problems indicated and is summarized in the following objects:

First, to provide a gas service connector which meets all the safety requirements, yet is inexpensive of manufacture and is easily installed.

Second, to provide a gas service connector which utilizes a novely arranged bimetallic tube and connecting inner sleeve, the tube having an enlarged end to receive the end of a plastic conduit, the inner sleeve being received within the end of a plastic conduit which, in turn, is received in the bimetallic tube, the bimetallic tube being constricted to mechanically interlock the sleeve within the plastic conduit as well as the bimetallic tube, and including a seal interposed between the tube and conduit.

Third, to provide a gas service connector, as indicated in the other objects, which may be received in a sheath pipe through which the plastic conduit extends, the sheath pipe serving as a support for a meter, valve or other device receiving the gas.

Fourth, to provide a gas service connector which may be partially assembled at a factory site then slipped over a plastic conduit at the point of use and readily and quickly constricted.

Fifth, to provide a means and method of forming a bimetallic tube uniquely suited for use as an element of the gas service connector.

DESCRIPTION OF THE FIGURES

FIG. 1 is a side view of the gas service connector as it appears when installed in a riser with portions shown in section.

FIG. 2 is an enlarged fragmentary sectional view taken through 2-2 of FIG. 1 with the riser omitted.

FIG. 3 is a similar enlarged fragmentary sectional view with portions in elevation showing the connector before attachment to a plastic conduit.

FIG. 4 is a fragmentary sectional view of the bimetallic tube forming a part of the connector and indicating the manner in which an inner liner is extended to form an inner lamination.

FIG. 5 is an enlarged fragmentary sectional view taken within circle 5 of FIG. 4.

The gas service connector includes a bimetallic tube 1 having an outer lamination 2 of copper or a copper alloy and an inner lamination 3 of aluminum or an aluminum alloy. The tube is provided with an enlarged end including a first enlargement 4 and a second or further enlargement 5. The extremity of the tube is reduced or constricted to the diameter of the first enlargement 4 as indicated as 6. The inner lamination 3 stops short of the first enlargement 4.

Mounted within the enlarged end of the tube 1 is a connecting sleeve 7 formed of aluminum or aluminum alloy. Its inner end portion is enlarged and provided with an annular channel 8 positioned within the inner lamination 3. The tube 1 is constricted in the region of the channel 8 forming externally a channel 9 and internally a rib 10 deformed into the channel 8 to form a mechanical interlock which may also form a seal.

The axially outer end portion of the sleeve 7 is provided with a series of annular channels 11 forming interlocking shoulders. The enlarged end of the tube 1 is initially in the condition in FIG. 3 and slidably receives a plastic conduit 12. A gasket ring 13 is received in the second enlargement 5. Upon insertion of the plastic conduit, the second enlargement 5 is constricted from the condition shown in FIG. 3 to the condition shown in FIG. 2, forcing the conduit 12 to deform and form internal ribs 14 which interlock within the channels 11 and may form a seal. Constriction or radial compression of the second enlargement 5 deforms the gasket ring 13 so as to provide a seal between the plastic conduit 12 and the surrounding portion of the tube 1. The constriction of the tube forms a portion 15 reduced diameter in the region of the rib 14 so that a mechanical interlock is provided between the conduit 12, gasket ring 13 and tube 1.

The plastic conduit 12 is dimensioned so as to be slidably received within s sheath pipe terminating in a riser 16. After the tube 1 has received the end of the plastic conduit 12 and its second enlargement 5 has been constricted as shown in FIGS. 1 and 2, the tube 1 and its connection with the plastic conduit 12 is dimensioned so as to be slidable in the riser. The upper end of the riser is provided with external screwthreads 17 to receive a fitting 18 having an internally screwthreaded portion 19 and an externally screwthreaded portion 20. Internally the externally screwthreaded portion 20 terminates in a constriction 21 limiting movement of the tube 1.

Internally the fitting 18 is provided with an intermediate bore 22, and a counter bore 23 including the internally screwthreaded portion 19. The intermediate bore receives a seal ring 24 and the counter bore 23 receives the flange of a compression collar 25 which extends into intermediate bore so that, when the fitting 18 is screwthreaded onto the riser 16, the seal ring 24 is compressed around the upper end of the tube 1.

The gas service connector is assembled as follows:

The inner lamination 3 terminates short of the enlarged portion 4 and the outer lamination 2 of the tube 1 is extended to form the first enlargement 4 and second enlargement 5. The inner sleeve 7 is inserted until its inner end is within the inner lamination 3 whereupon the tube 1 is constricted to form a channel 9 and the internal rib 10. When the gasket ring 13 is inserted, the assembly appears as shown in FIG. 3.

The plastic conduit 12 is inserted through the riser 16 so that it is exposed at the top end thereof and for insertion into the tube 1 in confronting relation to the inner lamination 3 whereupon the outer lamination 2 in the region of the second enlargement 5 is constricted to form a strong mechanical interlock between the plastic conduit 12 and the sleeve 13 and to compress the gasket ring 13 so as to form a seal between the plastic conduit 12 and the sleeve 7 as shown in FIG. 2. The connection is then retracted into the riser or sheath pipe 16 and the fitting 18 is applied as shown in FIG. 1.

The sleeve 7 is intended primarily to form a strong mechanical interlock between the tube 1 and the conduit 12, and a seal is obtained by the compressed gasket ring 13; however, the interlocking connections with the inner sleeve may also form redundant seals.

Reference is now directed to FIGS. 4 and 5 which illustrates a means and method of forming the bimetallic tube 1. Initially the inner lamination 3 is dimensioned so as to be slidably received in the outer lamination 2. A mandrel 26 is provided having a head 27. Fitted on the mandrel 26 adjacent the head 27 is a sizing collar 28 formed of nylon or similar high strength plastic. Mounted on the mandrel, is an expansion sleeve 29 having a tapered portion. The expansion sleeve is formed of polytetrafluorothylene or similar material. Such material has an extremely low coefficient of friction. When moved through the tube 1 as shown in FIG. 4, some erosion of the sleeve 29 occurs and forms a lubricating lamination 30 between the sizing collar 28 and the inner lamination 3 as shown in FIG. 5. The inner lamination is preferably extended sufficiently to effect limited elastic expansion of the outer lamination so that when the tube is completed the inner lamination is sealed with respect to the outer lamination.

Having fully described my invention it is to be understood that I am not to be limited to the details herein set forth, but that my invention is of the full scope of the appended claims.

I claim:

1. A gas service connector for plastic gas conduits, comprising:
   a. a metallic tubular member enlarged at one end to recieve a plastic gas conduit;
   b. an inner sleeve received in an end of the tubular member and an adjoining end of the plastic conduit;
   c. the metallic tube member having a first consticted region engaged with one end portion of the sleeve to form a first mechanical interlock therebetween, and a second constricted region surrounding the plastic conduit and the other end portion of the sleeve to form a second mechanical interlock between the sleeve and the plastic conduit;
   d. and means forming a seal between the tubular member and the plastic conduit.

2. A gas service connection as defined in claim 1, wherein:
   a. the seal means is disposed within the second constricted region and compressed upon constriction of the second constrictible region.

3. A gas service connector as defined in claim 1, wherein:
   a. the tubular member includes an outer lamination and an inner lamination, the inner lamination terminating short of the enlarged end;
   b. the sleeve being similar in composition to the inner lamination.

4. A gas service conncector as defined in claim 1, wherein:
   a. the tubular member and plastic conduit are received in a sheath pipe;
   b. and means of the extended end of the tubular member disposed in sealed relation to the corresponding end of the sheath pipe.

5. A gas pressure connector for plastic gas conduits, comprising:
   a. a metallic tubular member having an enlarged end portion, the tubular member having an inner lamination terminating short of the enlarged end;
   b. an inner sleeve secured and sealed to the inner lamination and extending into the enlarged end portion;
   c. the inner sleeve being inserted within a plastic gas conduit upon fitting the enlarged end of the tubular member over the plastic conduit;
   d. the tubular member being constricted over the plastic conduit to effect a seal between the plastic conduit and the inner sleeve.

6. A gas service connector as defined in claim 5, wherein:
   a. a seal ring surrounds the inner sleeve and is positioned to effect a sealed connection between the plastic conduit and tubular member upon constriction of said member.

* * * * *